W. A. BOX.
SIREN.
APPLICATION FILED MAY 19, 1915.

1,278,582.

Patented Sept. 10, 1918.
2 SHEETS—SHEET 2.

WITNESSES:
F. H. Cuno.
L. Rhoades

INVENTOR.
W. A. Box.
BY
ATTORNEY.

UNITED STATES PATENT OFFICE.

WILLIAM A. BOX, OF DENVER, COLORADO.

SIREN.

1,278,582.   Specification of Letters Patent.   Patented Sept. 10, 1918.

Application filed May 19, 1915. Serial No. 29,055.

*To all whom it may concern:*

Be it known that I, WILLIAM A. Box, a citizen of the United States, residing at Denver, in the county of Denver and State of Colorado, have invented certain new and useful Improvements in Sirens, of which the following is a specification.

This invention relates to sirens and its object resides in providing a motor driven sound-producing machine which by virtue of the volume and character of its tone, is particularly adapted for use as an alarm in case of fires and other emergencies.

In accordance with my invention an electric motor is mounted upon a suitable base in driving connection with a rotary element of the sound producing device which in its simplest form consists of a peripherally slotted stator and a correspondingly slotted, hollow rotor which loosely fits within the stator and which is open at one of its sides for the admission of air.

The rotor is axially alined with the shaft of the motor with which it is connected by means of a flexible coupling and when in the operation of the motor, it is rotated at a high velocity, the air which is drawn into the rotor and compressed against its circumferential surface, escapes through the peripheral slots of the same as they pass those in the stator. The blasts of air thus intermittently ejected in rapid succession produce a loud, penetrating sound, the pitch of which varies in accordance with the velocity at which the rotor revolves.

The rotor has between its peripheral slots radially inwardly projecting partitions which provide shallow pockets in which the air collects before it is discharged through the slots in the stator when those of the rotor are in register therewith.

The rotor is closed at one of its sides and has at its opposite side a narrow flange projecting inwardly from its circumferential wall to form the end wall of the pockets.

Figure 1:
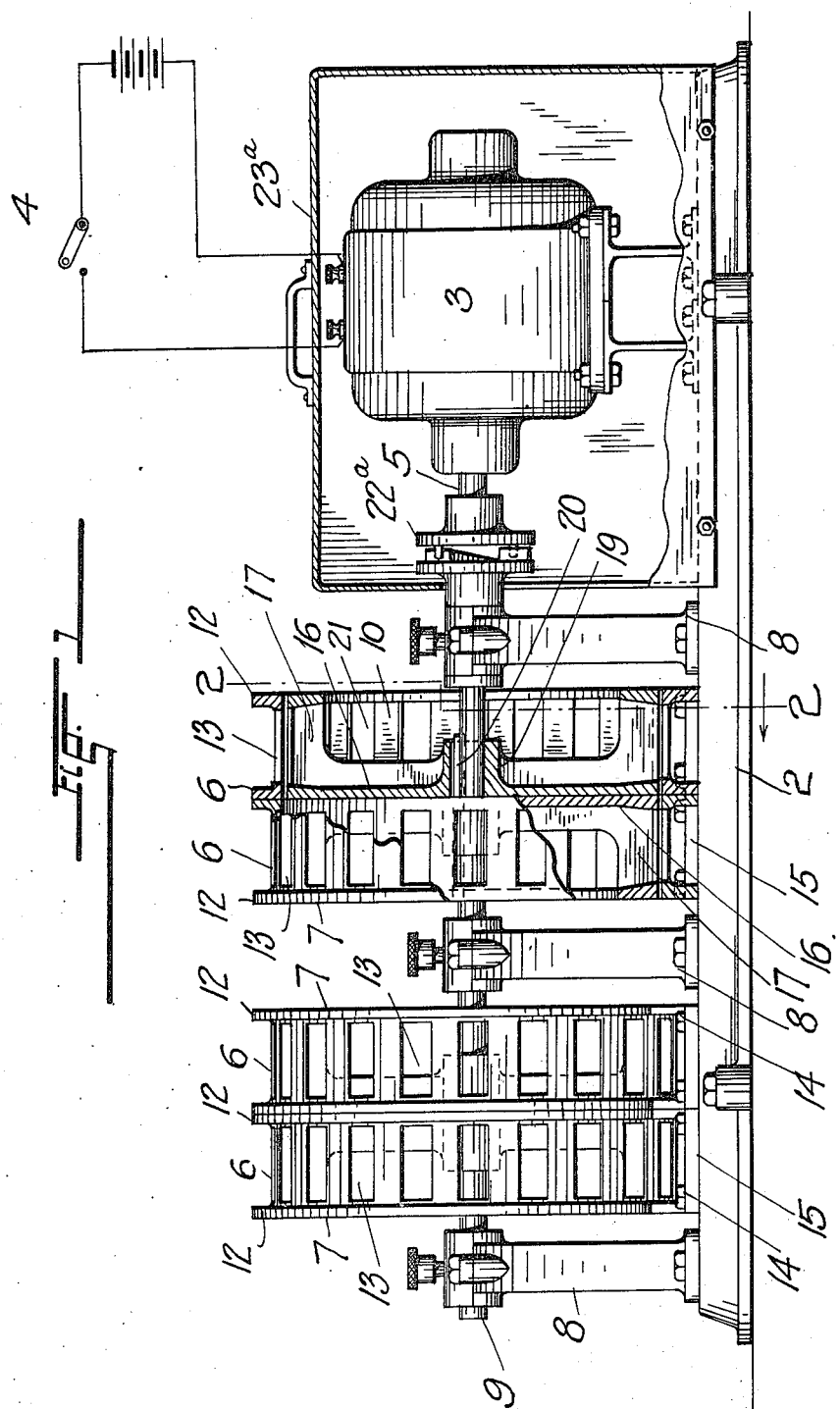
Figure 2:
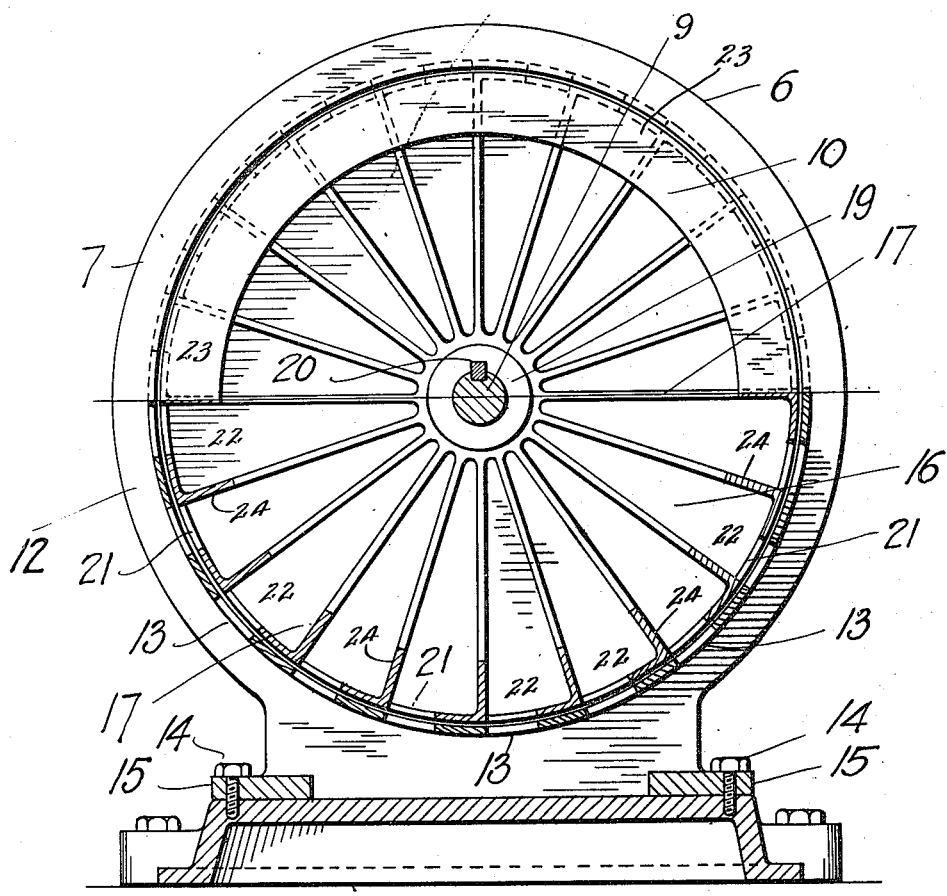

In the accompanying drawings in the various views of which like parts are similarly designated, Figure 1 is a partially sectional side elevation of a siren of my improved construction, having four sound producing units, and Fig. 2, a section taken along the line 2—2, Fig. 1, drawn to an enlarged scale.

Referring more specifically to the drawings, the reference numeral 2 designates the base of the machine which at one of its ends supports an electric motor 3 which is connected in a circuit the flow of current through which is controlled by a switch 4 of suitable construction.

Secured upon the base axially in alinement with the motor shaft 5, are the stators 6 of the sound producing units 7 which are preferably arranged in pairs between standards 8 erected upon the base for the rotary support of the shaft 9 which carries the rotors 10 of the units.

The stators of the units consist of annular open-sided housings which are reinforced by circumferential flanges 12 and which are fixedly secured upon the base.

The annular housings have a series of equidistantly disposed, transverse ports 13 through which in the operation of the machine, the air escapes, and they are secured upon the base by means of bolts 14 extending through lateral flanges 15 at their lower ends.

The rotors 10 of the units consist of hollow cylinders closed at one side by heads 16 and open at their opposite sides for the admission of air.

Equidistantly spaced spokes 17 extend radially along the head 16 of each rotor between a central hub 19 and the circumferential wall of the rotor at which point they are enlarged to provide the partitions 24 which divide the interior of the rotor adjacent its circumference into a plurality of shallow pockets 22 which at the open side of the rotor are closed by the inwardly extending narrow flange 23. The hub 19 is bored to receive the shaft 9 which is rigidly secured thereto by means of the key 20.

The pockets 22 of the rotor correspond in number with the peripheral ports of the stator in which the rotor is fitted and they are adapted to communicate with said ports for the discharge of their contents into the atmosphere, by ports 21 formed in the peripheral wall of the rotor between its partitions 24.

The spaces within the flange 23 constitute the inlet openings through which air is admitted to the interior of the rotor during its rapid rotary movement within the stator. The air entering the rotor is compressed within the respective peripheral pockets from which it escapes each time the ports in the circumferential wall of the rotor pass those in the corresponding wall of the stator.

The rotors of each pair of units on the base are placed in their respective stators with their closed sides juxtaposed and with their open sides outermost for the admission of air.

The shaft 9 which is axially alined with the motor shaft, is connected therewith by means of a flexible coupling 22ª of ordinary construction, and a hood 23ª secured to the base covers the motor to protect it from dust and moisture.

The siren is preferably placed upon an elevated structure for the unobstructed propagation of its sound, and one or more switches connected in the motor circuit, are installed at desirable points in the community so that in case of a fire or other emergency the siren can be put immediately in operation from different places.

The air which enters the rotors through their open sides is by their rapid rotary movement compressed against their interior peripheral surfaces and escapes in puffs through the ports as they pass those in the respective stators.

The blasts of air thus escaping intermittently in rapid succession, produce a continued penetrating and distinctive sound the pitch of which may be varied by alternately opening and closing the switch 4, thereby rendering the sound more noticeable and effective for the transmission of signals.

The stators of the units are preferably made of cast iron and the rotors of aluminum, and the revolving parts are slightly spaced from the surfaces of the respective stationary housings to eliminate friction in the operation of the machine.

Having thus described my invention what I claim and desire to secure by Letters-Patent is:

1. A device of the type described, including a stator having a plurality of peripheral ports guarded by peripheral flanges, a rotor, a driven shaft having said rotor mounted thereon, said rotor having one end headed and having a plurality of peripheral ports positioned to register with the stator-ports as said rotor is rotated, said rotor also having a plurality of radial spoke-like members extending along its head and radiating from a central hub of said rotor and having their outer peripheral portions extending laterally to, and terminating in an annular flange encircling a lateral opening of the rotor, said spoke-like radial members being attenuated or narrowed intermediate said peripheral laterally extended portions thereof and their hub portions, thus providing for dividing up, and directing the air currents, forced centrifugally thereinto, radially toward and out through the peripheral registering rotor and stator ports, said radial spoke-like members serving with their laterally extended peripheral portions to also collect and concentrate the air-currents at said ports for forced delivery and effective action, said rotor-ports also being guarded at their entrances from within the rotor by means of said annular flange, and means for driving said rotor driven shaft.

2. A device of the type described, including a plurality of stators arranged in pairs, each stator having a plurality of peripheral ports guarded by peripheral flanges extending continuously around the periphery of the stators, a plurality of pairs of rotors, a pair arranged within a pair of stators, a driven shaft having said rotors mounted thereon, each of said rotors having an air-intake-opening in the outer head thereof relatively commensurate with the diameters of the rotors and having a closed inner head, the closed heads of a pair of rotors being adjacent to each other, the rotors each having a plurality of ports adapted to register with the ports of its encompassing stator during rotation, said closed head of each rotor having a plurality of integral radial spoke-like members positioned edgewise to the head and radiating from a tubular or hub-portion of said head, the circumferential terminals of said radial members being extended into lateral partition-forming portions, the latter themselves terminating in an annular flange parallel with the closed head of the rotor, the edgewise-disposed radial spoke-like members, partition-forming portions and annular-flange forming a chute for the conduct of the air out through the rotor and stator ports.

In testimony whereof I have affixed my signature in presence of two witnesses.

WILLIAM A. BOX.

Witnesses:
G. J. ROLLANDET,
L. RHOADES.